Figure 1:
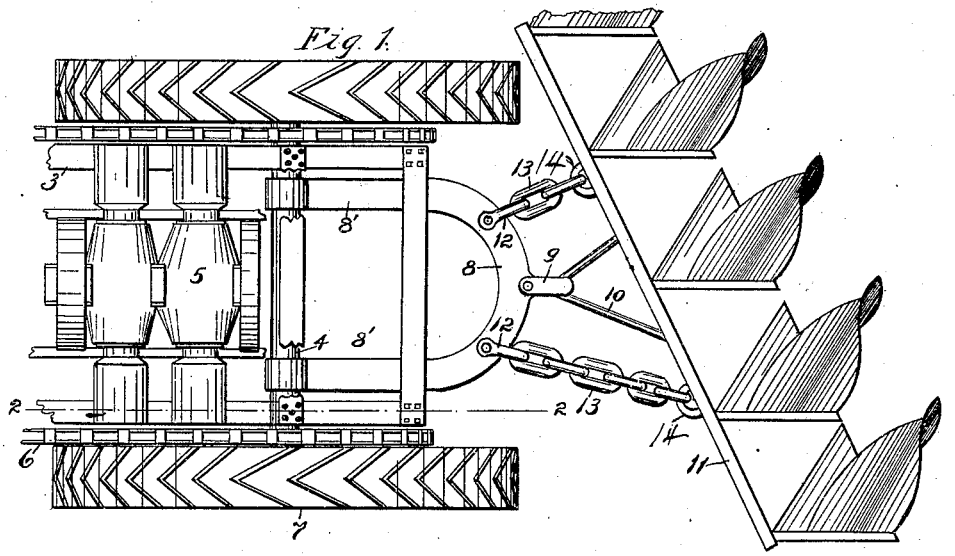
Figure 2:
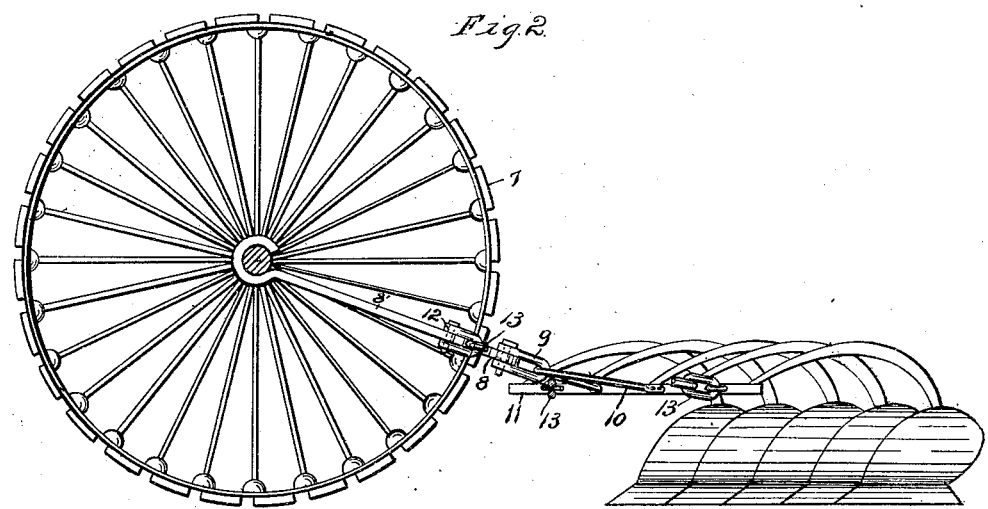

No. 841,691. PATENTED JAN. 22, 1907.
F. B. JOHNSON & J. C. CAPS.
MOTOR TRUCK.
APPLICATION FILED JAN. 30, 1906.

Witnesses:

Inventors:
Frank Burleigh Johnson,
John C. Caps.
By Arthur C. Brown
Atty.

UNITED STATES PATENT OFFICE.

FRANK BURLEIGH JOHNSON, OF HAYS, KANSAS, AND JOHN C. CAPS, OF KANSAS CITY, MISSOURI, ASSIGNORS TO THE FARMERS AUTO MOTOR COMPANY, A CORPORATION OF KANSAS.

MOTOR-TRUCK.

No. 841,691.　　　Specification of Letters Patent.　　　Patented Jan. 22, 1907.

Original application filed June 19, 1905, Serial No. 265,852. Divided and this application filed January 30, 1906. Serial No. 298,594.

*To all whom it may concern:*

Be it known that we, FRANK BURLEIGH JOHNSON, residing at Hays city, in the county of Ellis, State of Kansas, and JOHN C. CAPS, residing at Kansas City, in the county of Jackson and State of Missouri, citizens of the United States, have invented certain new and useful Improvements in Motor-Trucks; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our present invention relates to a motor-truck for use in heavy hauling, and especially adapted for farmwork, this application relating particularly to a draft-frame for such trucks and is a division of our application filed June 19, 1905, Serial No. 265,852.

It is the object of our present invention to provide a draft means for trucks to which a follower can be quickly and securely attached, which will allow a limited independent movement of such follower, and which may be removed from the truck or suspended from the truck-frame when not in use. In accomplishing this object we have provided the improved details of structure which will presently be fully described, and pointed out in the claim, reference being had to the accompanying drawings, forming part of this specification, in which like reference-numerals refer to like parts throughout both views, and in which—

Figure I is a top plan view of the rear portion of a motor-truck carrying a draft-frame constructed according to our invention and shown drawing a plow-gang. Fig. II is a side elevation of a portion of Fig. I on the line 2 2, Fig. I.

Referring more in detail to the parts, 3 represents the truck-frame, which is mounted on the rear axle 4 and carries a suitable motor 5.

6 represents sprocket-chains running over sprocket-wheels on the drive-shaft (not shown) and rear sprocket-wheels rigidly secured on axle 4 or on the hubs of the traction-wheels 7.

8 is the draft-frame, preferably U-shaped, the ends of the arms 8' of which are curved around and are carried by axle 4. Pivoted in the center of the base of frame 8 is a clevis 9, in which is anchored the forward end of the rod 10, the rear ends of said rod being rigidly secured to the draft-bar 11. Pivoted to frame 8 at each side of the center are the clevises 12, carrying chains 13, which extend backwardly and are anchored in rings 14 on bar 11. Attached to bar 11 is the follower, which may be of any suitable description, in the drawings shown as a plow-gang.

When not in use, frame 8 may be raised up and secured to the rear of frame 3 or the arms 8' may be so arranged as to slip over the rear axle and the frame be entirely removed. When it is desired to use the truck with a follower, the frame is lowered or attached to the axle and rod 10 and chains 13 connected with clevises 9 and 12. By regulating the length of the side chains a desired angle for the follower is secured, the pivotal connection of the clevises with the frame permitting a lateral, and the loose connection of the chains and rod with the clevises and of the frame with the rear axle permitting a vertical, movement of the follower, should an obstruction, such as a stone or stump, be met with. If so desired, means may be provided for raising the follower out of contact with the ground during its transport to and from the place where it is used.

Having thus described our invention, what we claim as new therein, and desire to secure by Letters Patent, is—

The combination with the truck-frame and running-gear of a forked draft-bar having its ends pivotally mounted on the truck-axle, a follower having a central draft-yoke connected with said draft-bar and adapted for vertical or horizontal movement in relation thereto, and adjustable draft means connected with said bar at the sides of said yoke connection, substantially as and for the purpose set forth.

In testimony whereof we affix our signatures in presence of two witnesses.

FRANK BURLEIGH JOHNSON.
　　　　　JOHN C. CAPS.

Witnesses:
　GEORGE A. NEAL,
　A. M. MAXWELL.